United States Patent
Lee

(10) Patent No.: US 11,267,469 B2
(45) Date of Patent: Mar. 8, 2022

(54) METHOD AND DEVICE FOR VEHICLE SPEED CONTROL WHEN TOWING HEAVY LOAD TRAILER

(71) Applicant: HYUNDAI KEFICO CORPORATION, Gunpo-si (KR)

(72) Inventor: Hyeong Tak Lee, Seoul (KR)

(73) Assignee: HYUNDAI KEFICO CORPORATION, Gunpo-si (KR)

( * ) Notice: Subject to any disclaimer, the term of this patent is extended or adjusted under 35 U.S.C. 154(b) by 0 days.

(21) Appl. No.: 17/077,708

(22) Filed: Oct. 22, 2020

(65) Prior Publication Data

US 2021/0039641 A1 Feb. 11, 2021

(30) Foreign Application Priority Data

Dec. 2, 2019 (KR) .......................... 10-2019-015830

(51) Int. Cl.
*B60W 30/18* (2012.01)
*B60W 30/14* (2006.01)
(Continued)

(52) U.S. Cl.
CPC ....... *B60W 30/146* (2013.01); *B60R 16/0231* (2013.01); *B60W 10/06* (2013.01); *B60W 10/10* (2013.01); *B60W 30/182* (2013.01); *B60W 30/18009* (2013.01); *B60W 30/1843* (2013.01); *B60W 40/072* (2013.01);
(Continued)

(58) Field of Classification Search
CPC .... B60W 10/06; B60W 10/10; B60W 30/146; B60W 30/18009; B60W 30/182; B60W 30/1843; B60W 40/072; B60W 40/076; B60W 50/14; B60W 2555/20; B60W 2552/15; B60W 2510/0676; B60W 2510/107; B60W 2710/0644; B60W 2710/1005; B60W 2720/10;
(Continued)

(56) References Cited

U.S. PATENT DOCUMENTS

2016/0297411 A1\* 10/2016 Trombley ................. B60T 7/20
2016/0332634 A1\* 11/2016 Jeong ...................... F16H 59/50
2019/0202511 A1\* 7/2019 Ho le .................... B60W 40/114

FOREIGN PATENT DOCUMENTS

JP 10-138795 A 5/1998
JP 2000-104614 A 4/2000
(Continued)

*Primary Examiner* — Edwin A Young
(74) *Attorney, Agent, or Firm* — Morgan, Lewis & Bockius LLP

(57) ABSTRACT

A method and device for vehicle speed control when towing a heavy load trailer are disclosed. The method includes determining whether a vehicle is in a trailer towing mode; determining whether the vehicle is in a slope-climbing situation or not using a G sensor based road gradient value when the vehicle is determined to be in the trailer towing mode; calculating a difference between the G sensor based road gradient value and a torque-based road gradient value, and determining whether a towed trailer is a heavy load trailer on the basis of the calculated difference, when it is determined the vehicle is in the slope-climbing situation; and performing shift control using a heavy load trailer dedicated shift map when the towed trailer is determined to be a heavy load trailer.

20 Claims, 4 Drawing Sheets

(51) Int. Cl.
*B60W 10/10* (2012.01)
*B60W 30/184* (2012.01)
*B60R 16/023* (2006.01)
*B60W 50/14* (2020.01)
*B60W 10/06* (2006.01)
*B60W 30/182* (2020.01)
*F16H 61/16* (2006.01)
*B60W 40/072* (2012.01)
*F16H 61/00* (2006.01)

(52) U.S. Cl.
CPC ............. *B60W 50/14* (2013.01); *F16H 61/16* (2013.01); *B60W 2510/0676* (2013.01); *B60W 2510/107* (2013.01); *B60W 2552/15* (2020.02); *B60W 2555/20* (2020.02); *B60W 2710/0644* (2013.01); *B60W 2710/1005* (2013.01); *B60W 2720/10* (2013.01); *F16H 2061/0075* (2013.01); *F16H 2312/00* (2013.01)

(58) Field of Classification Search
CPC ................. B60R 16/0231; F16H 61/16; F16H 2061/0075; F16H 2312/00
See application file for complete search history.

(56) References Cited

FOREIGN PATENT DOCUMENTS

| | | |
|---|---|---|
| JP | 2007-168724 A | 7/2007 |
| JP | 2013-199164 A | 10/2013 |
| JP | 2018-194045 A | 12/2018 |
| KR | 10-2007-0032592 A | 3/2007 |
| KR | 10-2010-0061148 A | 7/2010 |
| KR | 10-1673348 B1 | 11/2016 |
| KR | 10-1807618 B1 | 12/2017 |
| KR | 10-1836290 B1 | 3/2018 |

\* cited by examiner

METHOD AND DEVICE FOR VEHICLE SPEED CONTROL WHEN TOWING HEAVY LOAD TRAILER

CROSS REFERENCE TO RELATED APPLICATIONS

The present application claims priority to Korean Patent Application No. 10-2019-0158380 filed on Dec. 2, 2019, the entire contents of which is incorporated herein for all purposes by this reference.

BACKGROUND OF THE INVENTION

Field of the Invention

The present disclosure relates to a method and device for vehicle speed control when towing a trailer and, more particularly, to a method and device for vehicle speed control when towing a heavy load trailer, the method and device determining a situation where driving resistance increases sharply, such as when a vehicle climbs a slope with a trailer connected thereto, to be a heavy load trailer towing situation and taking appropriate follow-up measures (using a dedicated shift map, limiting a vehicle speed, and so on), thereby preventing overheating and increasing the stability of a transmission.

Description of the Related Art

When a trailer is connected to a vehicle, the driving resistance of the vehicle increases, which results in operation, climbing performance, and fuel efficiency of the vehicle being deteriorated. Therefore, in order to maintain good operation, climbing performance, and fuel efficiency of the vehicle, it is necessary to quickly determine whether a trailer is connected or not, and thus to control the vehicle with a shift pattern map different from that in a normal driving situation.

There are two types of methods of determining whether a trailer is connected to a vehicle in the related art. One is a method of calculating a total weight of the vehicle and then determining to be a trailer mode when the total weight is more than a certain value. The other is a method of determining whether a trailer is connected or not on the basis of an electric signal regarding whether a dedicated cable is connected when connecting the trailer and the vehicle using a connector.

The method of determining whether the trailer is connected or not using the total weight of the vehicle is a simple comparison method between the total weight and a basic vehicle weight by determining how much weight has increased relative to the basic vehicle weight. Accordingly, in case of large number of passengers, even when the trailer is not connected to the vehicle, the trailer is incorrectly determined to be connected to the vehicle, thereby worsening the vehicle's operation.

In addition, the method of determining whether the trailer is connected or not on the basis of the electric signal regarding whether the dedicated cable is connected or not when connecting the trailer with the vehicle using a connector is a method of determining whether the trailer is connected or not on the basis of the electric signal output from the dedicated controller (trailer controller) when the dedicated cable is connected, it is possible to quickly and accurately determine whether the trailer is mounted.

Meanwhile, when a vehicle climbs a slope with a trailer being connected, driving resistance increases sharply, compared to driving on flat ground. In order to respond to such increased driving resistance, a transmission is designed in such a manner as to generally perform downshifting in a slope-climbing situation. However, when the downshifting occurs, the engine speed increases. When such a condition persists, the possibility of engine failure or malfunction increases due to overheating of coolant temperature.

SUMMARY OF THE INVENTION

The present disclosure has been made to solve the above problems, and it is an objective of the present disclosure to provide a method and device for vehicle speed control when towing a heavy load trailer, the method and device determining a situation where driving resistance increases sharply, such as when a vehicle climbs a slope with a trailer connected thereto, to be a heavy load trailer towing situation and taking appropriate follow-up measures (using a dedicated shift map, limiting a vehicle speed, and so on), thereby preventing overheating and increasing the stability of a transmission.

In order to achieve the objective, according to an aspect of the present disclosure, a method for vehicle speed control when towing a heavy load trailer is provided, the method including determining whether a vehicle is in a trailer towing mode; determining whether the vehicle is in a slope-climbing situation or not using a G sensor based road gradient value when the vehicle is determined to be in the trailer towing mode; calculating a difference between the G sensor based road gradient value and a torque-based road gradient value, and determining whether a towed trailer is a heavy load trailer on the basis of the calculated difference, when it is determined the vehicle is in the slope-climbing situation; and performing shift control using a heavy load trailer dedicated shift map when the towed trailer is determined to be a heavy load trailer.

Preferably, the determining whether the vehicle is in the trailer towing mode may be performed by determining the vehicle to be in the trailer towing mode when a trailer connection signal is received.

In addition, the trailer may be recognized to remain connected to protect a transmission, even when the trailer connection signal is not received after a signal generation time is lapsed (CAN Time out) during receiving the trailer connection signal.

In addition, the determining whether or not the vehicle is in the slope-climbing situation may be performed by determining the vehicle to be in the slope-climbing situation when the G sensor based road gradient value (%) is greater than a predetermined reference gradient value (%).

In addition, the determining whether the towed trailer is a heavy load trailer may be performed by determining the trailer to be a heavy load trailer when the difference between the G sensor based road gradient value and the torque-based road gradient value is greater than a predetermined threshold.

In addition, a coolant temperature, an auto transmission fluid (ATF) oil temperature, and an outside temperature may be further included, as conditions, in addition to the difference, in the determining whether the towed trailer is the heavy load trailer.

In addition, the performing of the shift control may include transmitting a corresponding signal to an engine control unit and transmitting the corresponding signal to a cluster so that a warning message pops up to warn a driver, when the towed trailer is determined to be the heavy load trailer.

In addition, the method may further include continuously monitoring a coolant temperature during performing the shift control using the heavy load trailer dedicated shift map and limiting a vehicle speed and an engine speed so as not to exceed predetermined limit values when the coolant temperature is greater than a predetermined threshold.

In addition, the method may further include, when a vehicle state meets conditions for the vehicle returning to a normal driving mode during driving in a heavy load trailer mode, returning to the normal driving mode along with releasing the heavy load trailer mode.

Herein, the conditions for returning to the normal driving mode may be that the coolant temperature is less than or equal to a predetermined value, the G sensor based road gradient value is less than or equal to a predetermined reference gradient value (%), and the engine speed is less than a predetermined limit value.

In order to achieve the objective, according to another aspect of the present disclosure, a device for vehicle speed control when towing a heavy load trailer is provided, the device including a data detection unit including a G sensor for detecting acceleration of a vehicle and detecting data required for calculating a road gradient value; a transmission control unit (TCU) determining whether a trailer is towed and whether the towed trailer is a heavy load trailer using the data detected by the data detection unit; and an engine control unit receiving information on whether to tow the heavy load trailer from the transmission control unit and controlling an engine output, wherein the transmission control unit determines whether a vehicle is in a trailer towing mode; determines whether the vehicle is in a slope-climbing situation or not using a G sensor based road gradient value when the vehicle is determined to be in the trailer towing mode; calculates a difference between the G sensor based road gradient value and a torque-based road gradient value, and determining whether a towed trailer is a heavy load trailer on the basis of the calculated difference, when it is determined the vehicle is in the slope-climbing situation, and performs shift control using a heavy load trailer dedicated shift map when the towed trailer is determined to be a heavy load trailer.

Herein, the transmission control unit may be configured to determine the vehicle to be in the trailer towing mode in which the trailer is connected to the vehicle when a trailer connection signal is received from the data detection unit.

In addition, the transmission control unit may be configured so that the trailer is recognized to remain connected to protect a transmission, even when the trailer connection signal is not received after a signal generation time is lapsed (CAN Time out) during receiving the trailer connection signal.

In addition, the transmission control unit may be configured to determine the vehicle to be in the slope-climbing situation when the G sensor based road gradient value (%) is greater than a predetermined reference gradient value (%).

In addition, the transmission control unit may be configured to determine the trailer to be a heavy load trailer when the difference between the G sensor based road gradient value and the torque-based road gradient value is greater than a predetermined threshold.

In addition, the transmission control unit may be configured to determine whether the trailer is a heavy load trailer using a coolant temperature, an auto transmission fluid (ATF) oil temperature, and an outside temperature that are provided by the data detection unit, in addition to the difference, when determining whether the trailer is a heavy load trailer.

In addition, the transmission control unit may be configured to transmit a corresponding signal to an engine control unit and transmit the corresponding signal to a cluster so that a warning message pops up to warn a driver, when the towed trailer is determined to be the heavy load trailer.

In addition, the engine control unit may be configured to continuously monitor the coolant temperature during performing the shift control using the heavy load trailer dedicated shift map, and control an engine output in cooperation with the transmission control unit to limit a vehicle speed and an engine speed so as not to exceed predetermined limit values when the coolant temperature is greater than a predetermined threshold.

In addition, when a vehicle state meets conditions for the vehicle returning to a normal driving mode during driving in a heavy load trailer mode, the transmission control unit may be configured to release the heavy load trailer mode and return to the normal driving mode.

Herein, the conditions for the vehicle returning to the normal driving mode may be that the coolant temperature is less than or equal to a predetermined value, the G sensor based road gradient value is less than or equal to a predetermined reference gradient value (%), and the engine speed is less than a predetermined limit value.

According to a method and device for vehicle speed control when towing a heavy load trailer, it is possible to determine a situation where driving resistance increases sharply, such as when a vehicle climbs a slope with a trailer connected thereto, to be a heavy load trailer towing situation and taking appropriate follow-up measures (using a dedicated shift map, limiting a vehicle speed, and so on), thereby preventing overheating and increasing the stability of a transmission.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
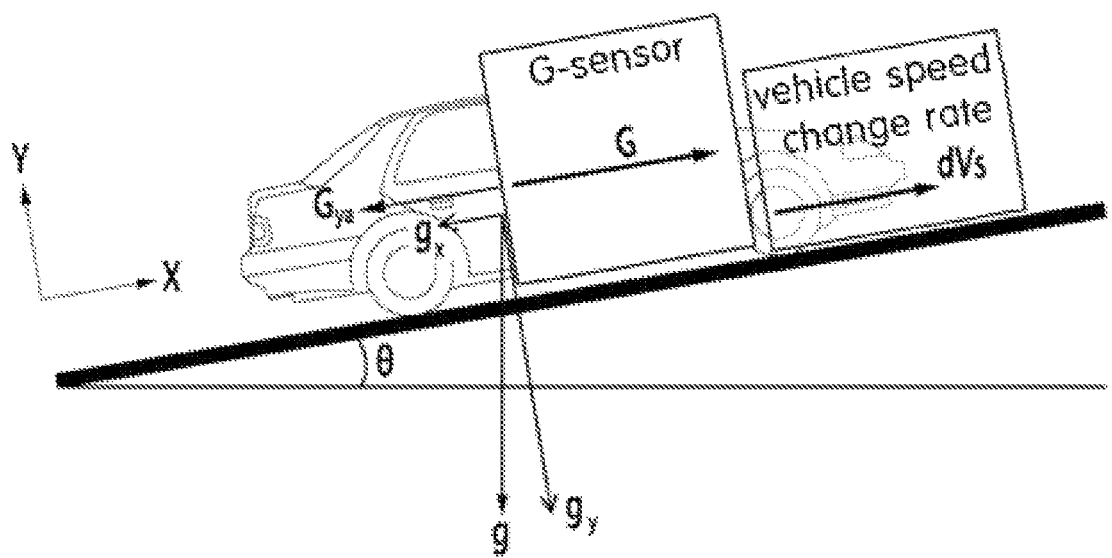
FIG. 1 is a reference diagram illustrating a calculation principle of a G sensor based road gradient value.

Hereinafter, a preferred embodiment of the present disclosure will be described in detail.

In describing the present disclosure, terms used in the following specification are only used to describe specific embodiments, and are not intended to limit the present disclosure. Singular expressions include plural expressions unless the context clearly indicates otherwise.

In addition, it is to be understood that terms such as "include" or "have" in the present specification are intended to designate the existence of features, numbers, steps, actions, components, parts, or combinations thereof described in the specification, but not to preclude the possibility of the presence or addition of one or more other features or numbers, steps, actions, components, parts, or combinations thereof.

In addition, terms such as first and second may be used to describe various components, but the components should not be limited by the terms. These terms are used only for the purpose of distinguishing one component from another component.

In addition, terms such as " . . . part", " . . . unit", and " . . . module" described in the specification mean a unit that processes at least one function or operation, and the unit may be implemented by hardware, software, or a combination of hardware and software.

In the description with reference to the accompanying drawings, the same drawing reference numerals are assigned to the same elements, and duplicate descriptions of the same elements will be omitted. In addition, in describing the present disclosure, when it is determined that a detailed description of a related known technology may unnecessarily obscure the subject matter of the present disclosure, a detailed description thereof will be omitted.

The meaning of terms used in describing the present disclosure will be briefly described.

Hereinafter, among terms used in the following description of the present disclosure, a "road gradient value" is a value representing a road inclination angle and given in percentage. For example, a road gradient value of 0% means a road with a road inclination angle of 0 degrees, that is, flat ground, and a road gradient of 100% means a road with a road inclination angle of 45 degrees.

In addition, among terms used in the following description of the present disclosure below, a "torque-based road gradient value" is a road gradient value calculated using a vehicle load that varies according to the road gradient, and means a theoretical gradient value. The torque-based road gradient value may be derived by a method of converting the difference in the rate of increase in vehicle speed compared to the flat ground into a road gradient for a certain output. Preferably, the torque-based road gradient value may be derived by the following calculation method.

Calculation of Torque-Based Road Gradient Value

A transmission input torque is calculated from a ratio of an engine torque to a converter torque, and a transmission output torque a is calculated by multiplying the transmission input torque by a gear ratio. In addition, a shaft rotation torque b is obtained through an engine speed increase rate and the gear ratio, and a driving resistance torque c is derived using a speed-resistance curve with the transmission output speed as a factor.

A net torque d (d=a−(b+c)) is calculated using the obtained torque values, and an acceleration e is obtained from a change in the transmission output speed. In addition, an obtained ratio of d to e, that is, an acceleration/net torque ratio f is obtained. Then, the obtained value f is corrected according to the outside temperature and oil temperature, thereby calculating the final torque-based gradient value.

Such a calculation method of the torque-based gradient value is a known technique (for example, a technique described in Japanese Patent Laid-Open Publication No. 2000-1046614), and thus a detailed description thereof will be omitted.

In addition, a "G sensor based road gradient value" means an actual road gradient value, as a road gradient value calculated using a G sensor output (longitudinal (vehicle traveling direction) acceleration). The G sensor based road gradient value may be derived in such a manner as to calculate the pitching slope by comparing the difference in the longitudinal G value compared to that on the flat ground with a vehicle speed increase rate, as the vertical gravity component is detected as the longitudinal G value when the vehicle is not positioned on flat ground.

Preferably, the G sensor based road gradient value may be determined by the following equation.

Calculation of G sensor based road gradient value $$\text{Gradient }(\%)=\tan\theta*100=k*(G-dVs)$$

In the above equation, θ means an inclination of the vehicle with respect to the horizontal plane in a longitudinal direction (vehicle's length direction), G means an acceleration in the vehicle traveling direction, and dVs means a rate of change in vehicle speed.

Here, G may be determined by the following equation.

$$G=dVs+gx=dVs+g\sin\theta\text{ (FIG. 1)}$$

The above k may be determined by the following equation.

$$k=1/g\sqrt{1-\sin^2\theta}$$

In the above equation, g means a gravitational acceleration of the vehicle.

Of course, it is also a known technique to calculate the road gradient value based on the above G sensor output.

Hereinafter, a preferred embodiment of the present disclosure will be described in detail with reference to the accompanying drawings.

Figure 2:
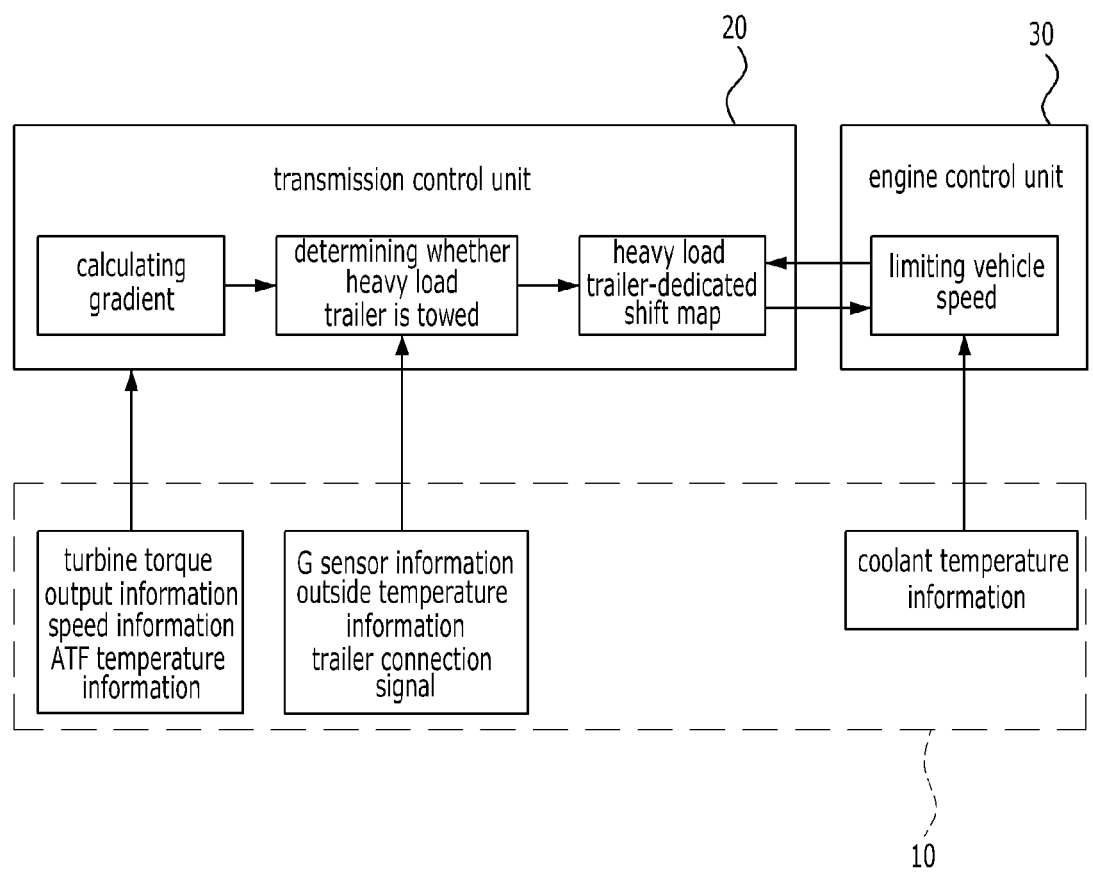
FIG. 2 is a schematic configuration diagram illustrating a device for vehicle speed control when towing a heavy load trailer according to an embodiment of the present disclosure.

FIG. 2 is a schematic configuration diagram illustrating a device for vehicle speed control when towing a heavy load trailer according to an embodiment of the present disclosure.

Referring to FIG. 2, a device for vehicle speed control when towing a heavy load trailer, according to an embodiment of the present disclosure, includes a data detection unit 10, a transmission control unit (TCU) 20, and an engine control unit (ECU) 30. The data detection unit 10 includes a G sensor (not shown) that detects an acceleration of the vehicle, detects data required for calculating the road gradient value, and provides the detected data to the transmission control unit 20.

The transmission control unit 20 receives the detected data provided by the data detection unit 10 and determines whether the trailer is towed, that is, the trailer is connected to the vehicle and whether the connected trailer is a heavy load trailer. The engine control unit 30 receives information on whether a heavy load trailer is towed or not from the transmission control unit 20 and, as necessarily, limits an engine output and limits a vehicle speed in cooperation with the transmission control unit 20.

The transmission control unit 20 preferably analyzes the detected data provided by the data detection unit 10. Then, it is determined whether the vehicle is currently in a trailer towing mode. As a result of determination through the data analysis, when it is determined to be in the trailer towing mode, it is determined whether a road where the vehicle is currently driving is a slope using the G sensor based road gradient value. In other words, it is determined whether the vehicle is in a slope-climbing situation.

In addition, when it is determined that the vehicle is in the slope-climbing situation, the transmission control unit 20 calculates a difference value between the G sensor based road gradient value and the torque-based road gradient value. In addition, it is determined whether the trailer is a heavy load trailer on the basis of the calculated difference value. Preferably, when a difference between the G sensor based road gradient value and the torque-based road gradient value is greater than a predetermined threshold, the connected trailer may be determined as a heavy load trailer.

Here, it should be preferably appreciated that what the trailer is determined to be a heavy load trailer means that, even though the trailer is not actually a heavy load trailer, the trailer is temporarily recognized as a heavy load trailer in a situation where driving resistance increases rapidly, such as when the vehicle climbs a slope with the trailer connected thereto, thereby making it possible to take appropriate follow-up measures (using a dedicated shift map, limiting vehicle speed, and so on).

When the towed trailer is determined to be a heavy load trailer, the transmission control unit 20 performs shift control using a heavy load trailer-dedicated shift map. Here, the heavy load trailer-dedicated shift map is a shift pattern map that is advantageously set for heavy load driving compared to the general road shift map and may be a matrix form of data including two factors of an APS output and a vehicle speed.

The transmission control unit 20 may preferably determine that the vehicle is in a trailer towing mode in which the trailer is connected to the vehicle when a trailer connection signal is received from the data detection unit 10. Herein, the transmission control unit 20 may be configured in such a manner as to remain the connection state to protect the transmission, even though the trailer connection signal is not received when a signal generation time is lapsed (CAN Time out) during receiving the trailer connection signal.

The transmission control unit 20 may also determine that the vehicle is climbing a slope when the G sensor based road gradient value (%) is greater than a predetermined reference gradient value (%), when determining whether the vehicle is climbing a slope using the G sensor based road gradient value (%). Here, the reference gradient value (%) is preferably 4%, but is not limited thereto, because it may vary depending on the vehicle specifications or environmental conditions.

In addition, the transmission control unit 20 may determine that the trailer is a heavy load trailer, when the difference between the two gradient values (torque-based road gradient value and G sensor based road gradient value) is greater than a predetermined threshold (%), when determining whether the trailer is a heavy load trailer on the basis of the difference between the G sensor based road gradient value and the torque-based road gradient value. Here, the predetermined threshold is preferably 6%, but is not limited thereto.

The transmission control unit 20 may preferably determine whether the trailer is a heavy load trailer using additional information provided by the data detection unit 10, in addition to the difference value, when determining whether the trailer connected to the vehicle is a heavy load trailer. Herein, the additional information may preferably be coolant temperature information, auto transmission fluid (ATF) oil temperature information, and outside temperature information.

When the trailer connected to the vehicle is determined to be the heavy load trailer, the transmission control unit 20 transmits a corresponding signal (a heavy load trailer connection state signal) to the engine control unit 30. In addition, the corresponding signal (heavy load trailer connection status signal) may be transmitted to a cluster so that a warning message may pop up to warn a driver.

The engine control unit 30 recognizes a heavy load trailer connection from the heavy load trailer state signal output from the transmission control unit 20. In addition, when the shift control is performed through the heavy load trailer dedicated shift map, the engine control unit 30 continuously monitors the coolant temperature. In addition, when the coolant temperature is greater than a predetermined threshold, the engine control unit 30 controls the engine output so that the vehicle speed and engine speed do not exceed predetermined limit values, and adjust the shift stage in cooperation with the transmission control unit 20.

Meanwhile, when a vehicle state meets conditions for the vehicle returning to a normal driving mode during driving in a heavy load trailer mode (mode using a heavy load trailer-dedicated shift map), the transmission control unit 20 performs a task for releasing the heavy load trailer mode and returning to the normal driving mode. Here, the normal driving mode means a mode using a general road driving shift map that is set to be suitable for driving on a general road.

The vehicle may be determined to meet the conditions for returning to the normal driving mode from the heavy load trailer mode, when the coolant temperature is less than or equal to the predetermined threshold, preferably a maximum value (about 95 degrees) in the generally known normal range, the G sensor based road gradient value is less than or equal to a predetermined reference gradient value (%), preferably 4%, and the engine speed is less than a predetermined limit value.

Hereinafter, according to an embodiment of the present disclosure, a process of controlling a vehicle speed of a heavy load trailer by a device for vehicle speed control device when towing a heavy load trailer will be described with reference to a flowchart.

Figure 3:
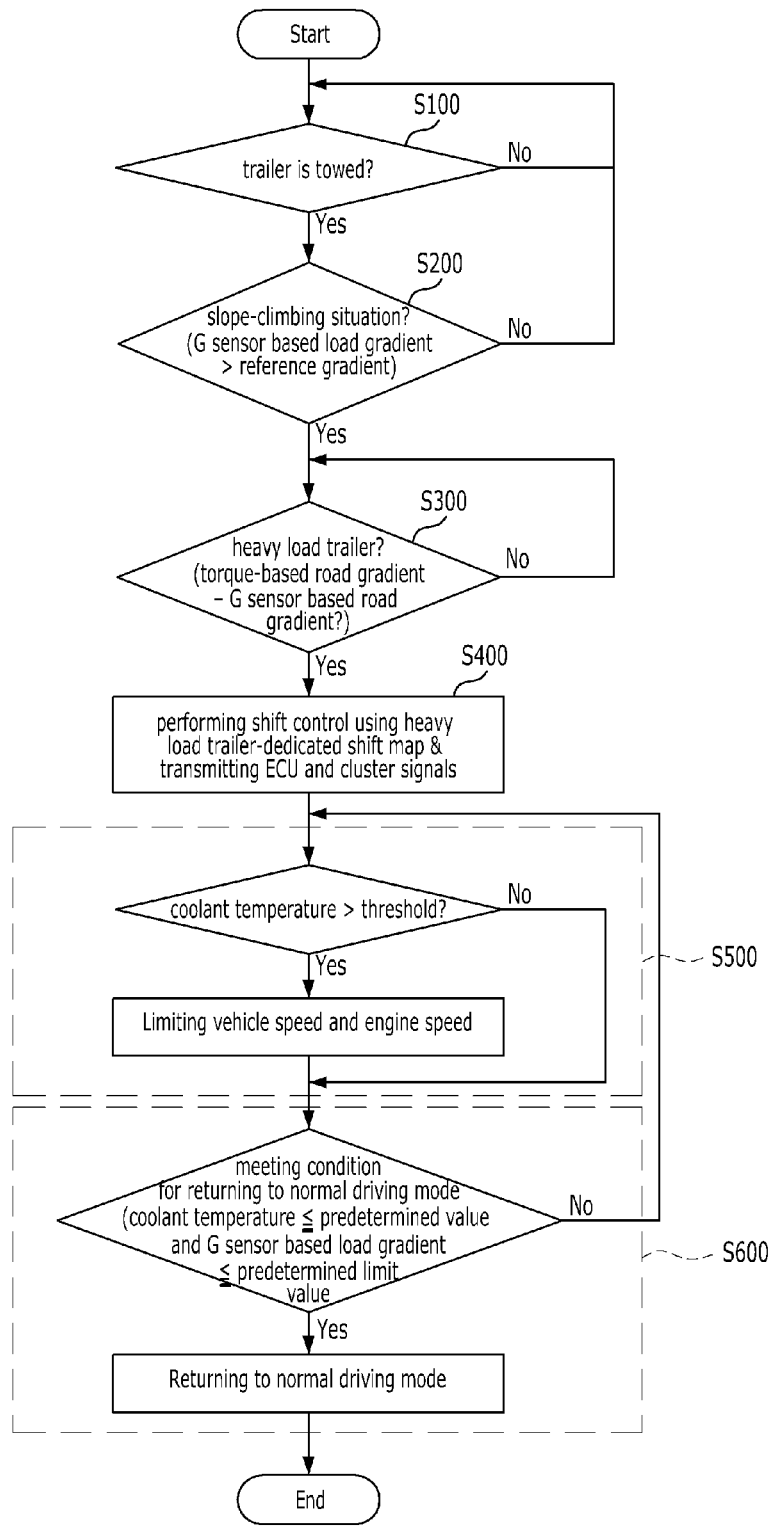
FIG. 3 is a control flowchart illustrating a method for vehicle speed control when towing a heavy load trailer according to an embodiment of the present disclosure.

FIG. 3 is a control flowchart illustrating a method for vehicle speed control when towing a heavy load trailer according to an embodiment of the present disclosure. For convenience of description, the configuration shown in FIG. 2 will be described with reference to corresponding reference numerals.

Referring to FIG. 3, the method for vehicle speed control when towing a heavy load trailer according to an embodiment of the present disclosure includes a step of determining whether a vehicle is in a trailer towing mode. In step S100, preferably, when a signal output from a dedicated controller (trailer controller), that is, a trailer connection signal, is received, when a dedicated cable is connected upon connecting the trailer with the vehicle using a connector, the vehicle may be determined to be in the trailer towing mode.

Here, the connection state may be remained to protect the transmission, even though the trailer connection signal is not received when a signal generation time is lapsed (CAN Time out) while receiving the trailer connection signal.

As a result of the determination through step S100, when the vehicle is determined to be in the trailer towing mode, it is determined whether the vehicle is in a slope-climbing situation using the G sensor based road gradient value (%) (S200). In step S200, it is preferable that when the G sensor based road gradient value (%) is greater than the predetermined reference gradient value (%), it may be determined that the vehicle is in the slope-climbing situation. Here, the reference gradient value may be 4%, but is not limited thereto.

As a result of the determination through step S200, when it is determined that the vehicle is in a slope-climbing situation, a difference between the G sensor based road gradient value and the torque-based road gradient value is calculated, and it is determined whether the towed trailer is a heavy load trailer on the basis of the calculated difference (S300). Preferably, when the difference value is greater than a predetermined threshold, the vehicle may be determined to be the heavy load trailer.

Here, the predetermined threshold used as a comparison criterion for the difference value is preferably 6%, but is not limited thereto.

In step S300, it may be determined whether the trailer is a heavy load trailer using additional information provided by the data detection unit 10, in addition to the difference, when determining whether the trailer connected to the vehicle is a heavy load trailer. Herein, the additional information may preferably be coolant temperature information, auto transmission fluid (ATF) oil temperature information, and outside temperature information.

As a result of the determination through step S300, when the towed trailer is determined to be a heavy load trailer, a process of performing shift control using a heavy load trailer-dedicated shift map (S400). Here, the heavy load trailer-dedicated shift map is a shift pattern map advantageously set to be suitable for heavy load driving compared to the general road shift map and may be a matrix form of data including two factors of an APS output and a vehicle speed.

In step S400, in addition to performing the shift control using the heavy load trailer-dedicated shift map, the transmission control unit 20 transmits a corresponding signal (a heavy load trailer connection status signal) to the engine control unit 30 and also transmits the corresponding signal (heavy load trailer connection status signal) to a cluster so that a warning message may pop up to warn a driver.

The method for vehicle speed control when towing a heavy load trailer according to an embodiment of the present disclosure may further include a step (S500) of continuously monitoring the coolant temperature even during performing the shift control using the heavy load trailer-dedicated shift map and, when the coolant temperature is greater than the predetermined threshold during monitoring, limiting the vehicle speed and engine speed so as not to exceed the predetermined limits.

In addition, when the vehicle state meets conditions for the vehicle returning to a normal driving mode during driving in a heavy load trailer mode (mode using a heavy load trailer-dedicated shift map), the method may further include a step (S600) of returning to the normal driving mode along with releasing the heavy load trailer mode. Here, the vehicle may return to the normal driving mode, when a coolant temperature is less than or equal to a predetermined value, a G sensor based road gradient value is less than or equal to a predetermined reference gradient value (%), and an engine speed is less than a predetermined limit value.

Here, the normal driving mode means a mode using a normal road driving shift map that is set to be suitable for driving on a general road.

In step S600, the vehicle may be determined to meet the conditions for returning to the normal driving mode from the heavy load trailer mode, when the coolant temperature is less than or equal to a predetermined threshold, preferably a maximum value (about 95 degrees) in the generally known normal range, the G sensor based road gradient value is less than or equal to a predetermined reference gradient value (%), preferably 4%, and the engine speed is less than a predetermined limit value.

Figure 4:
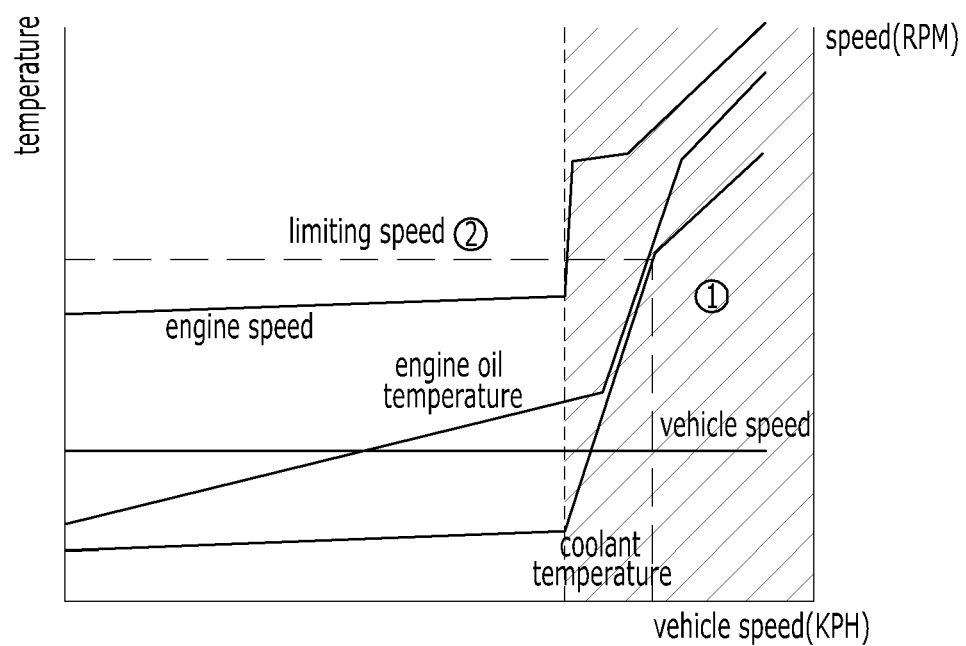
FIG. 4 is a graph showing a correlation between a vehicle speed, an engine speed, a coolant temperature, and an engine oil temperature to explain the operation and effect of the present disclosure.

FIG. 4 is a graph showing a correlation between a vehicle speed, an engine speed, a coolant temperature, and an engine oil temperature to explain the operation and effect of the present disclosure.

When a vehicle climbs a slope with a trailer connected thereto, driving resistance increases sharply compared to driving on flat ground. The transmission generally performs downshifting in a slope-climbing situation in order to respond to such increased driving resistance. When the downshifting occurs, the engine speed rises sharply as shown in an area ① of FIG. 4. When such a condition persists, the coolant temperature and engine oil temperature rise sharply, causing overheating, whereby there is an increased possibility that an engine FAIL occurs.

According to a method and device for vehicle speed control when towing a heavy load trailer, it is possible to determine a situation where driving resistance increases sharply, such as when a vehicle climbs a slope with a trailer connected thereto, to be a heavy load trailer towing situation and taking appropriate follow-up measures (using a dedicated shift map, limiting a vehicle speed, and so on), thereby preventing overheating and increasing the stability of a transmission.

In the above detailed description of the present disclosure, only specific embodiments according thereto have been described. However, it is to be understood that the present disclosure is not limited to the special form mentioned in the detailed description, but to include all modifications, equivalents, and substitutes within the spirit and scope of the present disclosure as defined by the appended claims.

The invention claimed is:

1. A method for vehicle speed control when towing a heavy load trailer, the method comprising:
   determining whether a vehicle is in a trailer towing mode;
   determining whether the vehicle is in a slope-climbing situation or not using a G sensor based road gradient value when the vehicle is determined to be in the trailer towing mode;
   calculating a difference between the G sensor based road gradient value and a torque-based road gradient value, and determining whether a towed trailer is a heavy load trailer on the basis of the calculated difference, when it is determined the vehicle is in the slope-climbing situation; and
   performing shift control using a heavy load trailer dedicated shift map when the towed trailer is determined to be the heavy load trailer.

2. The method of claim 1, wherein the determining whether the vehicle is in the trailer towing mode is performed by determining the vehicle to be in the trailer towing mode when a trailer connection signal is received.

3. The method of claim 2, wherein the trailer is recognized to remain connected to protect a transmission, even when the trailer connection signal is not received after a signal generation time is lapsed (CAN Time out) during receiving the trailer connection signal.

4. The method of claim 1, wherein the determining whether or not the vehicle is in the slope-climbing situation is performed by determining the vehicle to be in the slope-climbing situation when the G sensor based road gradient value (%) is greater than a predetermined reference gradient value (%).

5. The method of claim 1, wherein the determining whether the towed trailer is the heavy load trailer is performed by determining the trailer to be the heavy load trailer when the difference between the G sensor based road gradient value and the torque-based road gradient value is greater than a predetermined threshold.

6. The method of claim 1, wherein a coolant temperature, an auto transmission fluid (ATF) oil temperature, and an outside temperature are further included, as conditions, in addition to the difference, in the determining whether the towed trailer is the heavy load trailer.

7. The method of claim 1, wherein the performing of the shift control comprises transmitting a corresponding signal to an engine control unit and transmitting the corresponding signal to a cluster so that a warning message pops up to warn a driver, when the towed trailer is determined to be the heavy load trailer.

8. The method of claim 1, further comprising:
continuously monitoring a coolant temperature during performing the shift control using the heavy load trailer dedicated shift map and limiting a vehicle speed and an engine speed so as not to exceed predetermined limit values when the coolant temperature is greater than a predetermined threshold.

9. The method of claim 1, further comprising:
when a vehicle state meets conditions for the vehicle returning to a normal driving mode during driving in a heavy load trailer mode, returning to the normal driving mode along with releasing the heavy load trailer mode.

10. The method of claim 9, wherein the conditions for returning to the normal driving mode are that a coolant temperature is less than or equal to a predetermined value, the G sensor based road gradient value is less than or equal to a predetermined reference gradient value (%), and an engine speed is less than a predetermined limit value.

11. A device for vehicle speed control when towing a heavy load trailer, the device comprising:
a data detection unit including a G sensor for detecting acceleration of a vehicle and detecting data required for calculating a road gradient value;
a transmission control unit (TCU) determining whether a trailer is towed and whether the towed trailer is a heavy load trailer using the data detected by the data detection unit; and
an engine control unit receiving information on whether to tow the heavy load trailer from the transmission control unit and controlling an engine output,
wherein the transmission control unit
determines whether the vehicle is in a trailer towing mode;
determines whether the vehicle is in a slope-climbing situation or not using a G sensor based road gradient value when the vehicle is determined to be in the trailer towing mode;
calculates a difference between the G sensor based road gradient value and a torque-based road gradient value, and determining whether the towed trailer is the heavy load trailer on the basis of the calculated difference, when it is determined the vehicle is in the slope-climbing situation, and
performs shift control using a heavy load trailer dedicated shift map when the towed trailer is determined to be the heavy load trailer.

12. The device of claim 11, wherein the transmission control unit is configured to determine the vehicle to be in the trailer towing mode in which the trailer is connected to the vehicle when a trailer connection signal is received from the data detection unit.

13. The device of claim 12, wherein the transmission control unit is configured so that the trailer is recognized to remain connected to protect a transmission, even when the trailer connection signal is not received after a signal generation time is lapsed (CAN Time out) during receiving the trailer connection signal.

14. The device of claim 11, wherein the transmission control unit is configured to determine the vehicle to be in the slope-climbing situation when the G sensor based road gradient value (%) is greater than a predetermined reference gradient value (%).

15. The device of claim 11, wherein the transmission control unit is configured to determine the trailer to be the heavy load trailer when the difference between the G sensor based road gradient value and the torque-based road gradient value is greater than a predetermined threshold.

16. The device of claim 11, wherein the transmission control unit is configured to determine whether the trailer is the heavy load trailer using a coolant temperature, an auto transmission fluid (ATF) oil temperature, and an outside temperature that are provided by the data detection unit, in addition to the difference, when determining whether the trailer is the heavy load trailer.

17. The device of claim 11, wherein the transmission control unit is configured to transmit a corresponding signal to the engine control unit and transmit the corresponding signal to a cluster so that a warning message pops up to warn a driver, when the towed trailer is determined to be the heavy load trailer.

18. The device of claim 11, wherein the engine control unit is configured to continuously monitor a coolant temperature during performing the shift control using the heavy load trailer dedicated shift map, and control the engine output in cooperation with the transmission control unit to limit a vehicle speed and an engine speed so as not to exceed predetermined limit values when the coolant temperature is greater than a predetermined threshold.

19. The device of claim 11, wherein when a vehicle state meets conditions for the vehicle returning to a normal driving mode during driving in a heavy load trailer mode, the transmission control unit is configured to release the heavy load trailer mode and return to the normal driving mode.

20. The device of claim 19, wherein the conditions for the vehicle returning to the normal driving mode are that a coolant temperature is less than or equal to a predetermined value, the G sensor based road gradient value is less than or equal to a predetermined reference gradient value (%), and an engine speed is less than a predetermined limit value.

* * * * *